(12) United States Patent
DeLadurantaye

(10) Patent No.: US 10,859,460 B2
(45) Date of Patent: Dec. 8, 2020

(54) BLOWER UNIT AND COUPLING FOR DETECTING LEAKS

(71) Applicant: Sealtech Manufacturing USA, Macomb, MI (US)

(72) Inventor: Scott A. DeLadurantaye, Macomb, MI (US)

(73) Assignee: Sealtech Manufacturing USA, Macomb, MI (US)

( * ) Notice: Subject to any disclaimer, the term of this patent is extended or adjusted under 35 U.S.C. 154(b) by 131 days.

(21) Appl. No.: 16/058,223

(22) Filed: Aug. 8, 2018

(65) Prior Publication Data

US 2020/0049583 A1 Feb. 13, 2020

(51) Int. Cl.
*G01M 3/12* (2006.01)
*G01M 3/14* (2006.01)

(52) U.S. Cl.
CPC .................. *G01M 3/146* (2013.01)

(58) Field of Classification Search
CPC .......................... G01M 3/00–14; G01M 3/146
See application file for complete search history.

(56) References Cited

U.S. PATENT DOCUMENTS

| | | | | |
|---|---|---|---|---|
| 4,534,208 A | * | 8/1985 | Macin | G01M 3/10 455/226.1 |
| 5,780,722 A | * | 7/1998 | Kovacs | G01M 3/146 73/40 |
| 6,427,523 B1 | * | 8/2002 | Seabrook | G01M 3/146 73/40.7 |

* cited by examiner

*Primary Examiner* — Nguyen Q. Ha
(74) *Attorney, Agent, or Firm* — Young Basile Hanlin & MacFarlane, P.C.

(57) ABSTRACT

A coupling for use with a blower unit for detecting leaks in a structure, wherein the coupling is constructed and arranged to attach to a surface of the structure defining an opening and to the blower unit, and to allow air flow through the coupling when the blower unit is attached to the coupling and to prevent air flow through the coupling when the blower unit is not attached to the coupling, and wherein the coupling further includes a pressure port defined within a surface of the coupling constructed and arranged to accommodate at least one of a differential pressure gauge fitting or a tube.

36 Claims, 4 Drawing Sheets

BLOWER UNIT AND COUPLING FOR DETECTING LEAKS

TECHNICAL FIELD

The field to which the disclosure generally relates to includes leak detection devices.

BACKGROUND

A structure including, but not limited to, a vehicle may require the absence of leaks in order to perform optimally. A test may be performed on the structure to determine the presence and location of any leaks.

SUMMARY OF ILLUSTRATIVE VARIATIONS

A number of variations may comprise a coupling constructed and arranged for attachment to a blower unit for detecting leaks in a structure and for attachment to a surface of the structure defining an opening, and to allow air flow through the coupling when the blower unit is attached to the coupling and to prevent air flow through the coupling when the blower unit is not attached to the coupling, and wherein the coupling further includes a pressure port defined within a surface of the coupling constructed and arranged to accommodate at least one of a differential pressure gauge fitting or a tube.

A number of variations may comprise a product comprising: a blower unit constructed and arranged to attach to an exterior surface of a structure to pressurize an interior of the structure for leak testing of the structure, wherein the blower unit comprises an impeller unit and a conduit attached to the impeller unit, wherein the blower unit is constructed and arranged to direct an air flow from outside of the structure through the conduit and into the interior of the structure to pressurize the interior of the structure.

A number of variations may comprise a method comprising: providing an opening defined within a structure; operatively attaching a coupling to an exterior surface of the structure defining the opening so that the coupling is in fluid communication with the opening, wherein the coupling is constructed and arranged to be in a closed position to prevent air flow through the opening or an open position to allow air flow through the opening; attaching a blower unit to the coupling when the coupling is in an open position; flowing air into an interior of the structure to pressurize the interior of the structure using the blower unit; spraying a solution having a surface tension to produce bubbles when air is blown onto it; and determining a location of a leak where bubbles are present.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
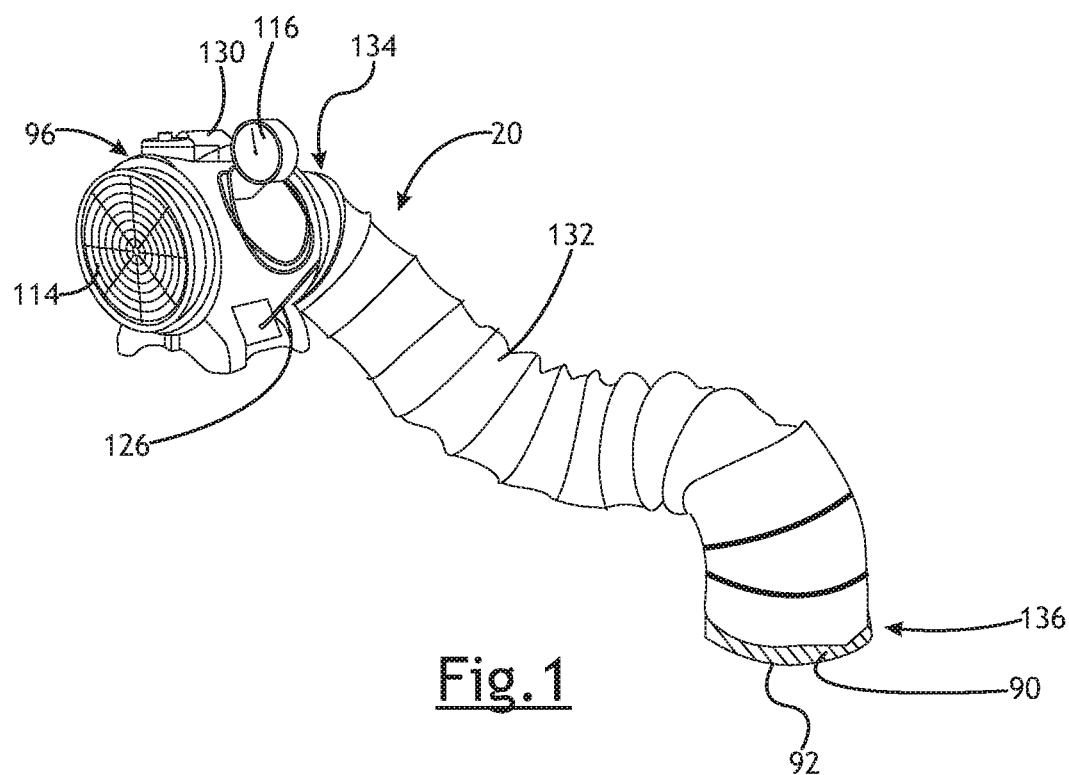
FIG. 1 illustrates a perspective view of a blower unit according to a number of variations.

The following description of the variations is merely illustrative in nature and is in no way intended to limit the scope of the invention, its application, or uses.

A blower unit may be used to test for leaks on an exterior of a structure including, but not limited to, a recreational vehicle including living quarters constructed and arranged for temporary accommodation. The blower unit may be attached to an opening defined within a surface of the structure via a coupling that may be surface mounted onto the structure and aligned with the opening so that the blower unit may be quickly and easily attached to the structure through the coupling. The blower unit may pressurize the interior of the structure. A soapy solution or solution having a surface tension to produce bubbles when air/gas is blown onto it, may be sprayed onto the exterior surface of the structure. Bubbles may form on the exterior of the structure, which may indicate the location of one or more leaks in the structure.

Referring to FIGS. 1 and 14-16, in a number of variations, a blower unit 20 may comprise an air impeller unit 96 and a conduit 132. In a number of variations, the blower unit 20 may be constructed and arranged to be secured to an opening 60 defined within a structure 58, including, but not limited to, a recreational vehicle, via a coupling 22. In a number of variations, an adaptor 72 may also be used with a coupling 22 in order to allow for the use of the blower unit 20 with any number of various sized and shaped openings in any number of locations within the structure 58, as will be further discussed hereafter. A connector 90 may be used to secure the conduit 132 to the coupling 22 and/or the adaptor 72, if used, as will be discussed hereafter.

Figure 2:
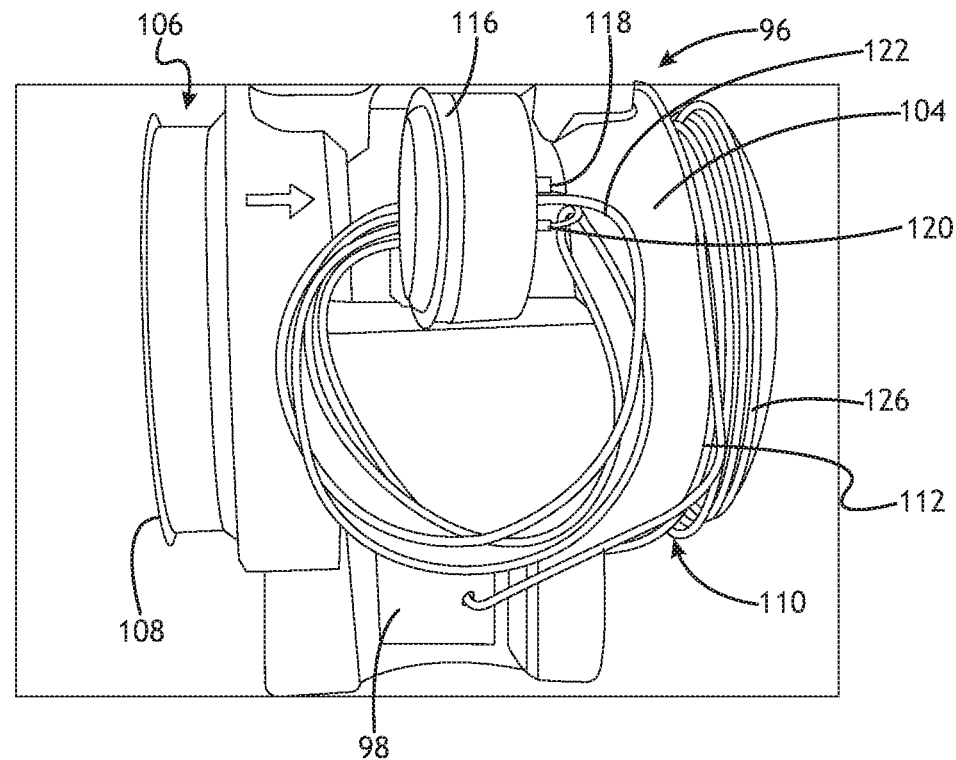
FIG. 2 illustrates a perspective view of an impeller unit according to a number of variations.

Referring to FIG. 2, in a number of variations, the air impeller unit 96 may be constructed and arranged to deliver a high volume of air at a low pressure. In a number of variations, the air impeller unit 96 may be constructed and arranged to deliver up to 2500 cubic feet of air per minute at 0 static pressure differential and capable of delivering about 1500 cubic air per minute through a static pressure differential of 0.6 inches of water column. The air impeller unit 96 may be compact and may include a diameter of less than 15 inches in diameter. The compact size of the air impeller unit 96 may allow an operator to easily move and handle the air impeller unit 96 and may allow for ease of storage of the air impeller unit 96.

Figure 3:
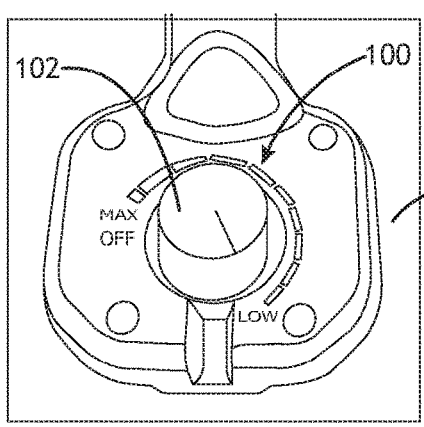
FIG. 3 illustrates a close-up perspective view of a controller according to a number of variations.

In a number of variations, the air impeller unit 96 may include an impeller (not illustrated). The impeller may be operatively attached to a motor 98 and may be constructed and arranged to be driven by the motor 98 to generate an air flow out of the impeller unit 96. In a number of variations, the motor 98 may be a variable speed motor constructed and arranged so that the speed of the motor 98 and, therefore, the speed of the impeller may be adjusted. The motor 98 may be operatively attached to a controller 100, a variation of which is illustrated in FIG. 3, and may be used to control the speed of the motor 98. Any number of controllers 100 may be used to adjust the speed of the motor 98. Referring to FIG. 3, in one variation, a controller 100 may include a dial 102 which may be rotated between a low position, a max position, and any position in between to adjust the speed of the motor 98. The variable speed motor 98 may allow the blower unit 20 to pressurize any number of various sized structures 58, as will be discussed hereafter.

Figure 4:
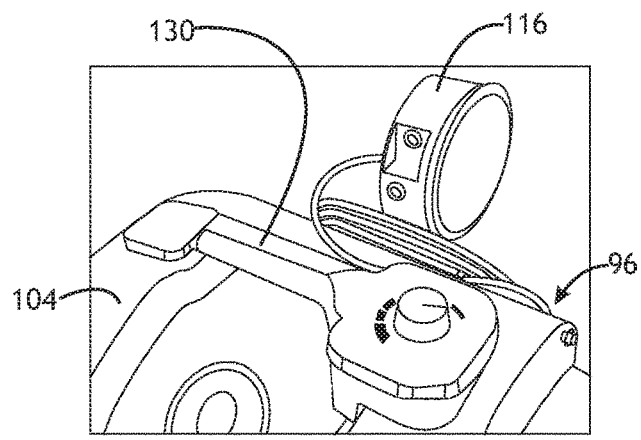
FIG. 4 illustrates a close-up perspective view of a handle of an impeller unit according to a number of variations.

Referring to FIGS. 2-4, in a number of variations, the impeller and the motor 98 may be at least partially enclosed within a housing 104. In a number of variations, a portion of the controller 100 may extend through a portion of the housing 104 so that an operator may easily access the controller 100. In a number of variations, the housing 104 may include a first end 106 having a first opening or vent 108 defined within a surface of the housing 104 and a second end 110 having a second opening or vent 112 defined within a surface of the housing 104. In a number of variations, the first opening 108 may be enclosed by a first grill 114, a variation of which is illustrated in FIG. 1, which may be constructed and arranged to allow air flow into the housing 104 so that when the impeller is rotating air flow may be drawn into the housing 104 through the first grill 114. The first grill 114 may also be constructed and arranged to prevent objects from entering into the housing 104 to protect the impeller and/or the motor 98 from damage, as well as to prevent injury to an operator from the impeller and/or the motor 98. In a number of variations, a second grill (not illustrated) may be attached to the second end 110 of the housing 104 and may allow air flow generated by the impeller to flow out of the housing 104. The second grill may also be constructed and arranged to prevent objects from entering into the housing 104 to protect the impeller and/or the motor 98 from damage, as well as to prevent injury to an operator from the impeller and/or the motor 98.

In a number of variations, a differential pressure gauge 116 may be operatively attached to the housing 104 and may be constructed and arranged to measure the difference in pressure between the environment outside of the structure 58 and the interior of the structure 58. The differential pressure gauge 116 may visually display the difference in pressure. The differential pressure gauge 116 may include a first pressure port/fitting 118 that may measure a first pressure including, but not limited to, a pressure of an environment outside of the structure 58, and a second pressure port/fitting 120 that may be constructed and arranged to measure a second pressure that may be within the interior of the structure 58. A first tube (not illustrated) may be in fluid communication with the first pressure port/fitting 118 and a second tube 122 may be in fluid communication with the second pressure port/fitting 120. The second tube 122 may include a length such that the tube 122 may extend through an opening 48 defined within the coupling 22 or to a pressure port fitting 124 seated within the opening 48 defined within the coupling 22, as will be discussed hereafter, to measure the pressure inside the structure 58.

Figure 14:
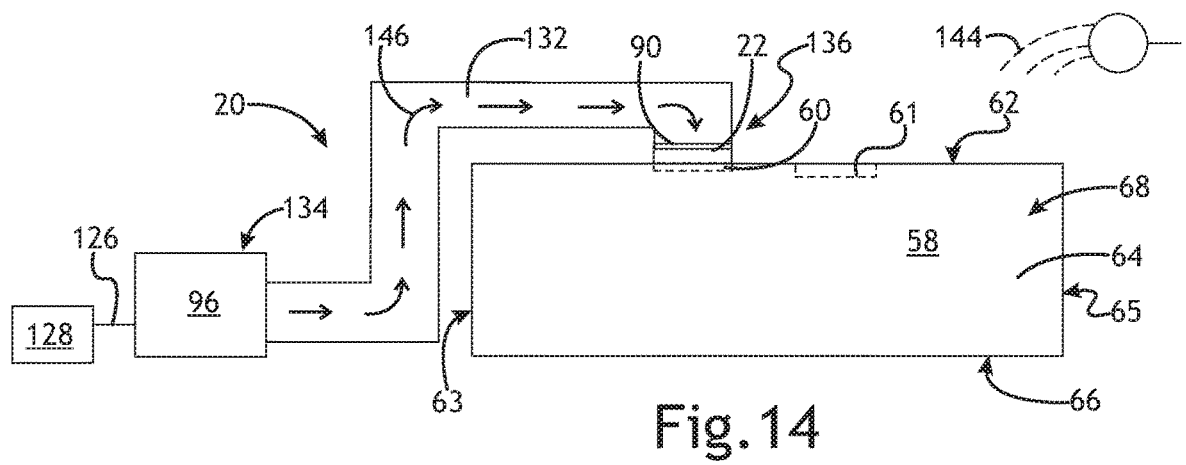
FIG. 14 illustrates a schematic of a blower unit attached to a structure according to a number of variations.
Figure 15:
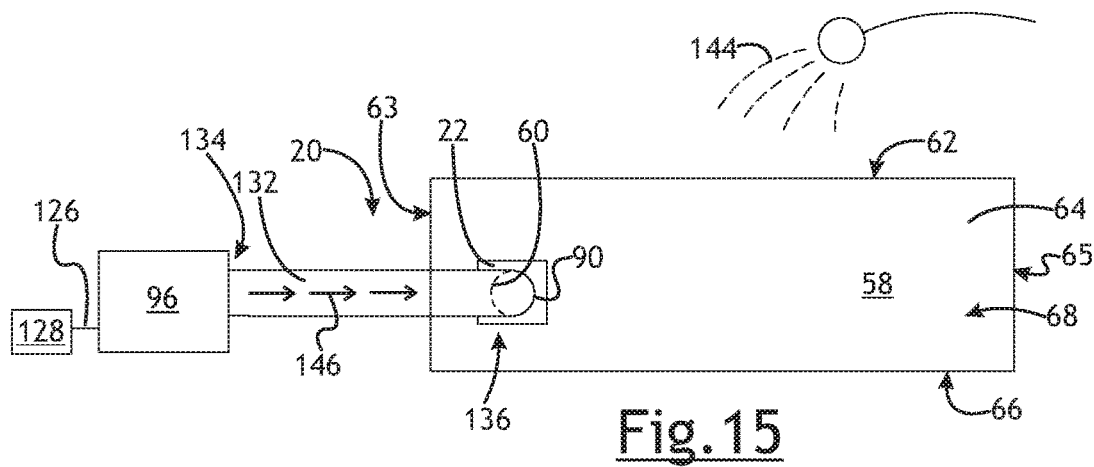
FIG. 15 illustrates a schematic of a blower unit attached to a structure according to a number of variations.
Figure 16:
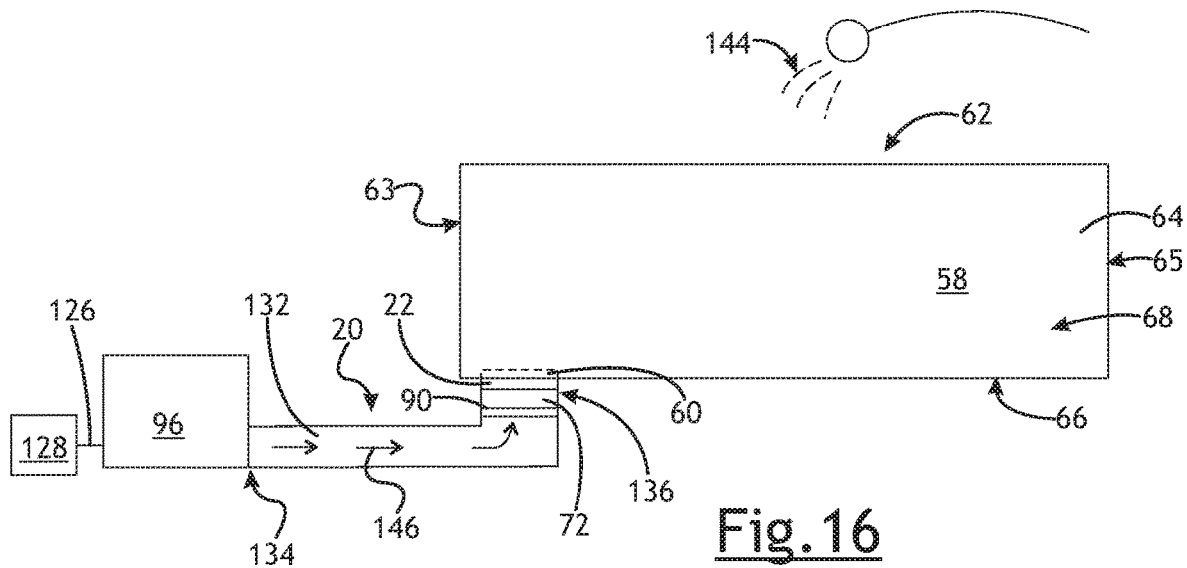
FIG. 16 illustrates a schematic of a blower unit attached to a structure according to a number of variations.

In a number of variations, the air impeller unit 96 may be constructed and arranged to receive power from a power source 128. In one variation, the impeller unit 96 may include a power cord and plug 126 that may be configured to receive power from an AC power source 128 (a variation of which is illustrated in FIGS. 14-16), which may be used to power the motor 98. Referring to FIG. 4, in a number of variations, the housing 104 may include, but is not required to have, a handle 130, which may assist in the handling of the air impeller unit 96. The handle 130 may be a separate component attached to the housing 104 or may be integral with the housing 104 so that it may be one single uniform continuous piece with the housing 104.

Referring again to FIGS. 1 and 14-16, the conduit 132 may include a first end 134 and a second end 136. The first end 134 may be removably attached to the surface of the housing 104 defining the second opening or vent 112 in the housing 104 of the air impeller unit 96. The first end 134 may be attached to the air impeller unit 96 in any number of variations including, but not limited to, one or more mechanical fasteners such as one or more bolts, clamps, belts, and/or pins (not illustrated). In a number of variations, the second end 136 may be constructed and arranged to attach to a coupling 22 and/or adaptor 72 via a connector 90, a variation of which is illustrated in FIG. 16, as will be further discussed hereafter. The conduit 132 may comprise an airtight flexible material that may be reinforced for strength to prevent the conduit 132 from collapsing during use. In one variation, the conduit 132 may comprise cotton impregnated with neoprene rubber and reinforced with a wire helix. Any suitable type of conduit 132 may be used. In one variation, an accordion shaped conduit 132 may be used to allow for flexible length and shape. The accordion shape of the conduit 132 may also allow for compact storage of the blower unit 20. The conduit 132 may include any number of suitable diameters that allow for air flow through the conduit 132, depending on the structure being testing. In one variation, a blower unit 20 used for pressurizing an interior of a recreational vehicle may include a 12-inch diameter conduit 132, which may provide optimal air flow to sufficiently pressurize the interior of the recreational vehicle in a timely manner.

Figure 5:
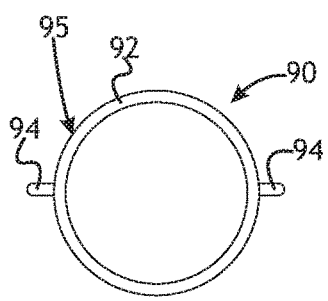
FIG. 5 illustrates a front view of a connector according to a number of variations.

Referring to FIGS. 1 and 5, in a number of variations, the second end 136 of the conduit 132 may include a connector 90 constructed and arranged to secure the conduit 132 to the coupling 22 and/or an adaptor 72. In a number of variations, the connector 90 may create a seal between the conduit 132 and the coupling 22. In one variation, the connector 90 may include a metal ring 92 that may be secured to the conduit 132 in any number of variations including, but not limited to, an adhesive and/or one or more mechanical fasteners. In a number of variations, a plurality of pins 94 may extend radially from an outer surface 95 of the metal ring 92 and may be constructed and arranged to mate with a plurality of openings 42 defined within a surface of the coupling 22 and/or adaptor 72. In another variation, the pins may extend from an inner surface of the metal ring (not illustrated).

Figure 13:
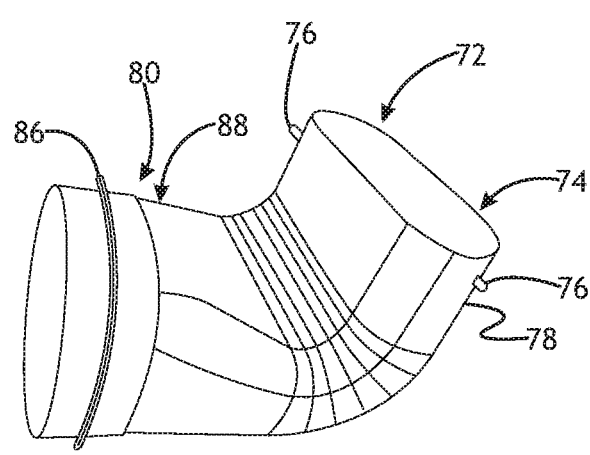
FIG. 13 illustrates a perspective view of an adaptor according to a number of variations.

In another variation, the connector 90 may comprise a strap or belt (not illustrated) which may extend around the conduit 132 and the coupling 22 and/or adaptor 72 to secure the conduit 132 to the coupling 22 and/or adaptor 72. In a number of variations, the coupling 22 and/or adaptor 72 may include a radial lip 86, a variation of which is illustrated in FIG. 13, to prevent the strap or belt from slipping off of the coupling 22 and/or adaptor 72 while air is being flowed through the conduit 132.

Referring to FIGS. 7, 9, and 14-16, in a number of variations, the coupling 22 may seat within an opening 60 defined within the structure 58. In a number of variations where the structure 58 is a recreational vehicle, the opening 60 may be an existing opening defined within the recreational vehicle 58, such as a vent or window. In another variation, the opening 60 may be made within a top surface 62 such as a roof of the recreational vehicle 58 separate and apart from the standard sized roof air vent 61 commonly found in recreational vehicles 58, for specific use with a coupling 22 constructed and arranged for attachment to a blower unit 20, a variation of which is illustrated in FIG. 14. In another variation, the opening 60 may be made within a side surface 64, a variation of which is illustrated in FIG. 15, a front surface 65, rear surface 63, or bottom surface 66, a variation of which is illustrated in FIG. 16, of the recreational vehicle 58 for specific use with a coupling 22 constructed and arranged for attachment to a blower unit 20 for leak testing. In another variation, the opening 60 may be made as an aftermarket improvement of the recreational vehicle 58 for specific use with a coupling 22 constructed and arranged for attachment with a blower unit 20 for leak testing of the recreational vehicle 58 in any of the top surface 62, side surface 64, front surface 65, rear surface 63, or bottom surface 66.

Figure 10:
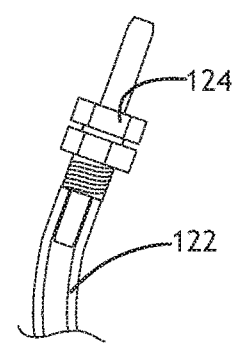
FIG. 10 illustrates a close-up perspective view of a pressure port fitting according to a number of variations.

In a number of variations, the coupling 22 may be constructed and arranged to allow air flow through the opening 60 of the structure 58 when a blower unit 20 may be attached to the coupling 22 and constructed and arranged to prevent air flow through the opening 60 when the blower unit 20 is not attached to the coupling 22. The coupling 22 may also be constructed and arranged to accommodate a pressure port fitting 124 and/or a pressure port tube 122. In a number of variations, a coupling 22 for use with a recreational vehicle may include an approximate ¼ inch opening to accommodate a ¼ inch pressure port fitting 124, a variation of which is illustrated in FIG. 10.

Figure 6:
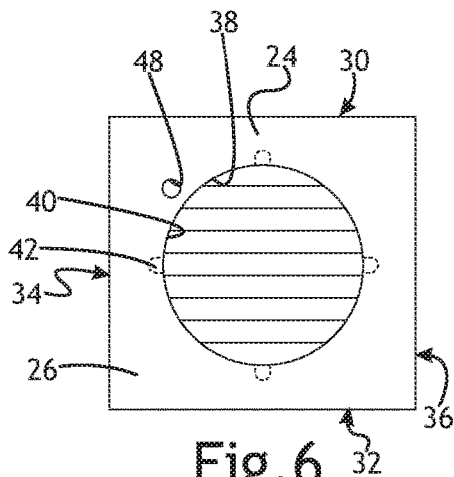
FIG. 6 illustrates a front view of a coupling according to a number of variations.
Figure 7:
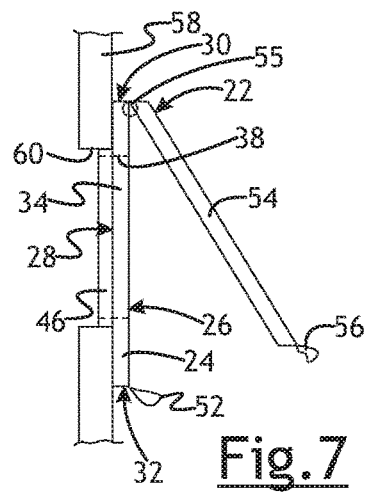
FIG. 7 illustrates a side view of a coupling according to a number of variations.
Figure 8:
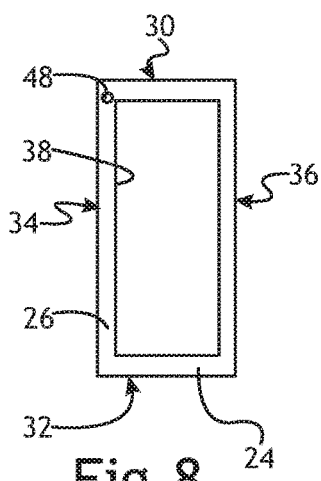
FIG. 8 illustrates a front view of a coupling according to a number of variations.

Referring to FIGS. 6-9, in a number of variations, a coupling 22 may comprise a plate 24 and a door 54. In a number of variations, the plate 24 may comprise a front face 26, a rear face 28, a top face 30, a bottom face 32, a first side face 34, and a second side face 36. A first opening 38 may extend through the front face 26 to the rear face 28 and may be defined by an inner surface 40 of the plate 24. The first opening 38 may be any number of configurations including, but not limited to, circular (a variation of which is illustrated in FIG. 6), rectangular (a variation of which is illustrated in FIG. 8), oval, or any polygonal shape such as a triangle or square. In a number of variations, a coupling 22 for use with a recreational vehicle may include a circular first opening 38 having a diameter of approximately 12 inches, which may be an optimal size to allow air flow from a 12-inch diameter conduit 132 through the opening 60 in the recreational vehicle. In another variation, a coupling 22 for use with a recreational vehicle may include a rectangular first opening 38 having a width of 6-inches and a length of 19-inches, which may also provide for optimal air flow from a 12-inch diameter conduit 132 through the opening 60 in the recreational vehicle to pressurize the interior of a recreational vehicle in a timely manner. In a number of variations, a vent grill 44 may be disposed within the first opening 38 defined within the coupling 22, a variation of which is illustrated in FIG. 6.

In a number of variations, a lip 46 may extend outward from the rear face 28 adjacent the perimeter of the inner surface 40 of the first opening 38. The lip 46 may be constructed and arranged to fit within the opening 38 and seat within the inner surface defining the opening 60 in the structure 58. In a number of variations, a single lip 46 may extend around the entire perimeter of the inner surface 40 or one or more lips 46 may extend along one or more select portions of the inner surface 40.

Figure 9:
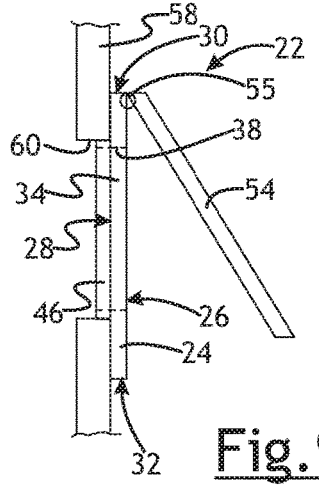
FIG. 9 illustrates a side view of a coupling according to a number of variations.

Referring to FIGS. 7 and 9, in a number of variations, the door 54 may be rotatably secured to the plate 24 via one or more mechanical hinges 55. The door 54 may be constructed and arranged to rotate between a first closed position so that the door 54 covers the openings 38, 60 defined within the coupling 22 and the structure 58 to prevent air flow through the coupling 22, and a second position wherein the door 54 may be in an open position so that the openings 38, 60 defined within the coupling 22 and the structure 58 are exposed to allow for attachment of the conduit 132 of the blower unit 20 to the coupling 22 so that the conduit 123 may be in fluid communication with the interior of the structure 58. In a number of variations, the door 54 may include a latch 56 that may mate with a hook 52 on the plate 24, so that the door 54 may be selectively locked in the closed position to prevent inadvertent air flow or contaminants through the coupling 22, a variation of which is illustrated in FIG. 7. The coupling 22 may be secured to a surface of the structure 58 in any number of variations so that the first opening 38 in the plate 24 is aligned with the opening 60 in the structure 58. In one variation, the lip 46 of the plate 24 may be held within the opening 60 through at least one of a press-fit, an adhesive, and/or one or more mechanical fasteners such as one or more screws or bolts.

Referring to FIG. 6, in a number of variations, the inner surface 40 of the first opening 38 may also include one or more cavities or openings 42 which may mate with one or more pins 94 of a connector 90 that may be used to secure the conduit 132 to the coupling 22 and/or one or more pins 76 of an adaptor 72, as will be further discussed below. In another variation, a second lip (not illustrated) may extend outward opposite of the first lip 46 and may include one or more openings which may be used to secure the conduit 132 to the coupling 22 and/or may be used to secure an adaptor 72 to the coupling 22, as will be further discussed below.

In a number of variations, a second opening 48 may extend through the front face 26 and the rear face 28 of the plate 24. The second opening 48 may be offset from the first opening 38 and may be significantly smaller than the first opening 38. The second opening 48 may be constructed and arranged to accommodate a pressure port fitting 124 and/or a pressure port tube 122 operatively connected to the differential pressure gauge 116, a variation of which is illustrated in FIG. 10.

Referring to FIGS. 14-16, in a number of variations, the coupling 22 may be attached to an exterior surface 68 of the structure 58 for use with a blower unit 20 constructed and arranged to pressurize the interior of the structure 58 from outside the structure 58. In another variation, the coupling 22 may be attached to an interior surface of the structure 58 for attachment to a blower unit constructed and arranged to pressurize the structure 58 from inside the structure 58, such as the blower unit described in U.S. Pat. No. 6,427,523, which is herein incorporated by reference.

Figure 11:
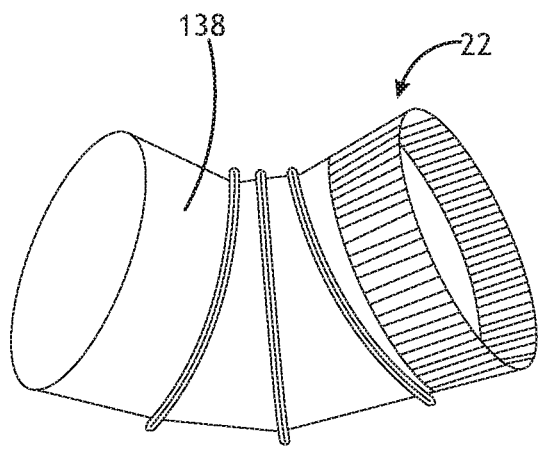
FIG. 11 illustrates a perspective view of a coupling according to a number of variations.

Referring to FIG. 11, in a number of variations, a coupling 22 configured for attachment to a blower unit constructed and arranged to pressurize a structure from the interior of the structure may comprise a ducted elbow 138 and may be constructed and arranged to attach to a conduit 132 via a connector 90, as described above. In a number of variations, a ducted elbow coupling 22 for use with a recreational vehicle may include a diameter of 12-inches, which may be optimal for delivering sufficient air flow into the interior of the recreational vehicle to pressurize the recreational vehicle in a timely manner. The ducted elbow 138 may be installed in any number of locations in a structure 58 including, but not limited to, a storage compartment, kitchen cabinetry, and/or bathroom cabinetry of a recreational vehicle.

In another variation, a coupling 22 for a recreational vehicle may be a floor mounted register (not illustrated) and may be ducted into any of the various stereo compartments in the recreational vehicle.

Figure 12:
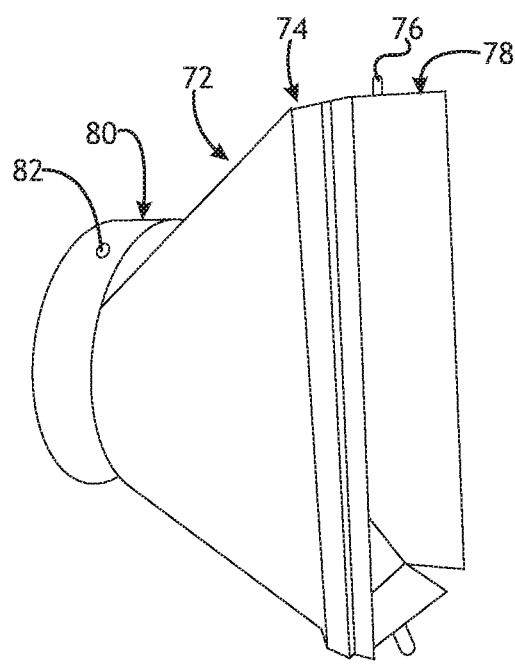
FIG. 12 illustrates a perspective view of an adaptor according to a number of variations.

Referring to FIGS. 12-13, in a number of variations, an adaptor 72 may be used with any of the above variations of couplings 22 constructed and arranged to attach the conduit 132 of the blower unit 20 to the coupling 22, in particular, if a non-circular first opening 38 in the coupling 22 is used. In a number of variations, an adaptor 72 may include a first portion 74 and a second portion 80. In a number of variations, the first portion 74 may be any number of shaped cross-sections including, but not limited to, circular, oval (a variation of which is illustrated in FIG. 13), rectangular (a variation of which is illustrated in FIG. 12), or any polygonal shape. In a number of variations, the first portion 74 may be constructed and arranged to have a complementary shape to the first opening 38 for attachment of the first portion 74 to the first opening 38 of the coupling 22. The first portion 74 may include one or more pins 76, a variation of which is illustrated in FIG. 13, that may extend radially outward from an outer surface 78 of the first portion 74. The one or more pins 76 may be constructed and arranged to mate with one or more openings 42 defined within the coupling 22 to secure the adaptor 72 to the coupling 22. In a number of variations, one or more pins may extend from an inner surface of the first portion (not illustrated) to attach to the coupling 22. In a number of variations, the second portion 80 may extend from the first portion 74 and may transition into a circular cross-section which may have a complementary shape to the conduit 132 for attachment to the conduit 132. In a number of variations, an adaptor 72 for use with a recreational vehicle may include a second portion 80 having a diameter of 12 inches which may provide for optimal air flow through the opening 60 defined within the recreational vehicle. The second portion 80 may be constructed and arranged to attach to the conduit 132 in any number of variations. In a number of variations, the second portion 80 may include one or more openings 82 defined within a surface of the second portion 80, a variation of which is illustrated in FIG. 12, that may mate with one or more pins 94 of the connector 90 to secure the conduit 132 to the adaptor 72. In another variation, the second portion 80 may include a radial lip 86, a variation of which is illustrated in FIG. 13, that may extend from an outer surface 88 of the second portion 80 and may be constructed and arranged so that the connector 90, including, but not limited to, a belt, may be held in place so that the conduit 132 may not inadvertently slip off of the adaptor 72 while the blower unit 20 may be sending air flow through the conduit 132 to the interior of the structure 58.

Referring to FIGS. 14-16, in a number of variations, the blower unit 20 may be used to test a structure 58 including, but not limited to, a recreational vehicle for leaks through the exterior of the structure 58. In a number of variations, a coupling 22 may be secured to an opening 60 defined within the structure 58. An adaptor 72, if required, may then be secured to the coupling 22, a variation of which is illustrated in FIG. 16. The blower unit 20 may be positioned outside of the structure 58, which may allow for less invasive leak testing of the structure 58 as an operator would not have to enter the structure 58 to conduct the testing. The conduit 132 of the blower unit 20 may be attached directly to the coupling 22 or directly to the adaptor 72, if used, via a connector 90. The blower unit 20 may then be plugged into a power source 128 and turned on via a controller 100 of the blower unit 20. The air impeller unit 96 may generate an air flow 146 from outside the structure 58 and may push the air flow 146 through the conduit 132, through the coupling 22, and into the interior of the structure 58 to pressurize the interior of the structure 58. The amount of air flow 146 into the structure 58 may be controlled by the controller 100, which may control a speed of the motor 98 of the blower unit 20 and, therefore, the speed of the impeller of the blower unit 20. While the interior of the structure 58 is pressurized, a soapy solution 144 or a solution having a surface tension to produce bubbles when air/gas is blown onto it, may be sprayed onto the exterior of the structure 58. The solution 144 may be sprayed onto the exterior of the structure 58 in any number of variations known in the art. Any location on the exterior of the structure 58 that shows evidence of bubbling of the solution 144 may indicate a leak in the structure 58.

It is noted that a recreational vehicle is described above for use with the blower unit for illustrative purposes only and any number of vehicles including, but not limited to, buses, submarines, trailers, etc., may be tested for leaks using the blower unit. Further, any combination of the above variations may be used without departing from the spirit and scope of the invention.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a coupling constructed and arranged for attachment to a blower unit for detecting leaks in a structure and for attachment to a surface of the structure defining an opening and to allow air flow through the coupling when the blower unit is attached to the coupling and to prevent air flow through the coupling when the blower unit is not attached to the coupling, and wherein the coupling further includes a pressure port defined within a surface of the coupling constructed and arranged to accommodate at least one of a differential pressure gauge fitting or a tube.

Variation 2 may include a product as set forth in Variation 1, wherein the coupling comprises: a plate, wherein the plate comprises a first opening defined by a first inner surface of the plate, at least one lip extending axially from the first inner surface, wherein the at least one lip is constructed and arranged to seat within the opening defined within the structure, and wherein the port comprises a second opening defined by a second inner surface of the plate; and a door, wherein the door is rotatably attached to the plate.

Variation 3 may include a product as set forth in Variation 2, wherein the first inner surface further comprises at least one third opening or cavity constructed and arranged to accommodate one or more mechanical fasteners.

Variation 4 may include a product as set forth in any of Variations 2-3, wherein the door further comprises at least one latch and the plate further comprises at least one hook, and wherein the at least one latch is constructed and arranged to attach to the at least one hook on the plate to lock the door in a closed position.

Variation 5 may include a product as set forth in any of Variations 1-4, wherein the differential pressure gauge fitting is secured within the port.

Variation 6 may include a product as set forth in any of Variations 2-5, wherein the first opening is circular.

Variation 7 may include a product as set forth in Variation 6, wherein the first opening has a diameter of 12-inches.

Variation 8 may include a product as set forth in any of Variations 2-5, wherein the first opening is rectangular.

Variation 9 may include a product as set forth in Variation 8, wherein the first opening has a length of 19-inches and a width of 6-inches.

Variation 10 may include a product as set forth in any of Variations 1-9, further comprising an adaptor, wherein the adaptor is constructed and arranged to operatively attach to the coupling and the blower unit.

Variation 11 may include a product as set forth in Variation 10, wherein the adaptor comprises a first portion constructed and arranged to attach to the inner surface of the plate and a second portion constructed and arranged to attach to the blower unit.

Variation 12 may include a product as set forth in any of Variations 10-11, wherein the adaptor comprises a first portion having a first cross-section that complements a cross-section of the first opening in the plate and a second portion having a second cross-section that complements a cross-section of a conduit of the blower unit.

Variation 13 may include a product as set forth in Variation 12, wherein the second cross-section of the adaptor is circular.

Variation 14 may include a product as set forth in Variation 13, wherein the second cross-section of the adaptor has a diameter of 12-inches.

Variation 15 may include a product as set forth in Variation 1, wherein the coupling comprises a ducted elbow.

Variation 16 may include a product as set forth in Variation 1, wherein the coupling comprises a floor register.

Variation 17 may include a product as set forth in any of Variations 1-16, wherein the coupling further comprises a grill.

Variation 18 may include a product comprising a blower unit constructed and arranged to attach to an exterior surface of a structure to pressurize an interior of the structure for leak testing of the structure, wherein the blower unit comprises an impeller unit and a conduit attached to the impeller unit, wherein the blower unit is constructed and arranged to direct an air flow from outside of the structure through the conduit and into the interior of the structure to pressurize the interior of the structure.

Variation 19 may include a product as set forth in Variation 18, wherein the air impeller unit is compact and has a diameter of less than 15-inches.

Variation 20 may include a product as set forth in any of Variations 18-19, wherein the structure is a recreational vehicle.

Variation 21 may include a product as set forth in any of Variations 18-20, wherein the blower unit is constructed and arranged to attach to a coupling attached to an opening in the recreational vehicle.

Variation 22 may include a product as set forth in any of Variations 18-21, wherein the opening is defined within a top surface, a side surface, a front surface, a rear surface, or a bottom surface of the recreational vehicle, separate and apart from a roof vent in the recreational vehicle.

Variation 23 may include a method comprising: providing an opening defined within a structure; operatively attaching a coupling to an exterior surface of the structure defining the opening so that the coupling is in fluid communication with the opening, wherein the coupling is constructed and arranged to be in a closed position to prevent air flow through the opening or an open position to allow air flow through the opening; attaching a blower unit to the coupling when the coupling is in an open position; flowing air into an interior of the structure to pressurize the interior of the structure using the blower unit; spraying a solution having a surface tension to produce bubbles when air is blown onto it; and determining a location of a leak where bubbles are present.

Variation 24 may include a method as set forth in Variation 23, further comprising attaching an adaptor to the coupling and attaching the blower unit to the coupling via the adaptor.

Variation 25 may include a method as set forth in any of Variations 23-24, wherein the structure is a recreational vehicle comprising a roof vent, and wherein the coupling is attached to a roof of the recreational vehicle separate and apart from the roof vent.

Variation 26 may include a method as set forth in any of Variations 23-24, wherein the structure is a recreational vehicle, and wherein the coupling is attached to a side surface, a front surface, or a rear surface of the recreational vehicle.

Variation 27 may include a method as set forth in any of Variations 23-24, wherein the structure is a recreational vehicle, and wherein the coupling is attached to a bottom surface of the recreational vehicle.

The above description of select variations within the scope of the invention is merely illustrative in nature and, thus, variations or variants thereof are not to be regarded as a departure from the spirit and scope of the invention.

What is claimed is:

1. A product comprising: a coupling constructed and arranged for attachment to a blower unit for detecting leaks in a structure and for attachment to a surface of the structure defining an opening, and to allow air flow through the coupling when the blower unit is attached to the coupling and to prevent air flow through the coupling when the blower unit is not attached to the coupling, and wherein the coupling further includes a pressure port defined within a surface of the coupling constructed and arranged to accommodate at least one of a differential pressure gauge fitting or tube.

2. The product of claim 1, wherein the differential pressure gauge fitting is secured within the port.

3. The product of claim 1, wherein the coupling comprises a ducted elbow.

4. The product of claim 1, wherein the coupling comprises a floor register.

5. The product of claim 1, wherein the coupling further comprises a grill.

6. The product of claim 1, wherein the coupling comprises: a plate, wherein the plate comprises a first opening defined by a first inner surface of the plate, at least one lip extending axially from the first inner surface, wherein the at least one lip is constructed and arranged to seat within the opening defined within the structure, and wherein the port comprises a second opening defined by a second inner surface of the plate; and a door, wherein the door is rotatably attached to the plate.

7. The product of claim 6, wherein the first opening is circular.

8. The product of claim 7, wherein the first opening has a diameter of 12-inches.

9. The product of claim 6, wherein the first opening is rectangular.

10. The product of claim 9, wherein the first opening has a length of 19-inches and a width of 6-inches.

11. The product of claim 6, wherein the first inner surface further comprises at least one third opening or cavity constructed and arranged to accommodate one or more mechanical fasteners.

12. The product of claim 6, wherein the door further comprises at least one latch and the plate further comprises at least one hook, and wherein the at least one latch is constructed and arranged to attach to the at least one hook on the plate to lock the door in a closed position.

13. The product of claim 1 further comprising an adaptor, wherein the adaptor is constructed and arranged to operatively attach to the coupling and the blower unit.

14. The product of claim 13, wherein the adaptor comprises a first portion constructed and arranged to attach to the inner surface of the plate and a second portion constructed and arranged to attach to the blower unit.

15. The product of claim 13, wherein the adaptor comprises a first portion having a first cross-section that complements a cross-section of the first opening in the plate and a second portion having a second cross-section that complements a cross-section of a conduit of the blower unit.

16. The product of claim 15, wherein the second cross-section of the adaptor is circular.

17. The product of claim 16, wherein the second cross-section of the adaptor has a diameter of 12-inches.

18. A product comprising:
a blower unit constructed and arranged to attach to an exterior surface of a structure to pressurize an interior of the structure for leak testing of the structure, wherein the blower unit comprises an impeller unit and a conduit attached to the impeller unit, wherein the blower unit is constructed and arranged to direct an air flow from outside of the structure through the conduit and into the interior of the structure to pressurize the interior of the structure, the blower unit comprising a housing and a differential pressure gauge attached to the housing.

19. The product of claim 18, wherein the air impeller unit is compact and has a diameter of less than 15-inches.

20. The product of claim 18, wherein the structure is a recreational vehicle.

21. The product of claim 20, wherein the blower unit is constructed and arranged to attach to a coupling attached to an opening in the recreational vehicle.

22. The product of claim 21, wherein the opening is defined within a top surface, a side surface, a front surface, a rear surface, or a bottom surface of the recreational vehicle, separate and apart from a roof vent in the recreational vehicle.

23. A method comprising:
providing an opening defined within a structure;
operatively attaching a coupling to an exterior surface of the structure defining the opening so that the coupling is in fluid communication with the opening, wherein the coupling is constructed and arranged to be in a closed position to prevent air flow through the opening or an open position to allow air flow through the opening;
attaching a blower unit to the coupling when the coupling is in an open position, the blower unit comprising a housing and a differential pressure gauge attached to the housing;
flowing air into an interior of the structure to pressurize the interior of the structure using the blower unit;
spraying a solution having a surface tension to produce bubbles when air is blown onto it; and
determining a location of a leak where bubbles are present.

24. The method of claim 23, further comprising attaching an adaptor to the coupling and attaching the blower unit to the coupling via the adaptor.

25. The method of claim 23, wherein the structure is a recreational vehicle comprising a roof vent, and wherein the coupling is attached to a roof of the recreational vehicle separate and apart from the roof vent.

26. The method of claim 23, wherein the structure is a recreational vehicle, and wherein the coupling is attached to a side surface, a front surface, or a rear surface of the recreational vehicle.

27. The method of claim 23, wherein the structure is a recreational vehicle, and wherein the coupling is attached to a bottom surface of the recreational vehicle.

28. A product as set forth in claim 18 wherein the differential pressure gauge comprises a first pressure port or outlet, and a second pressure port or outlet.

29. A product as set forth in claim 28 wherein the first pressure port or outlet is constructed and arranged to measure a pressure of the environment outside of the blower unit, and wherein the second pressure port or outlet is constructed and arranged to measure a pressure inside the structure.

30. A product as set forth in claim 29 further comprising a tube in fluid communications with the second pressure port or outlet.

31. A product as set forth in claim 18 further comprising a flexible conduit connected to the blower unit at one end and having a second end having a connector for connecting to the structure.

32. A product as set forth in claim 31 wherein the conduit is reinforced with a wire helix.

33. A product as set forth in claim 32 wherein the flexible conduit comprises cotton impregnated with neoprene rubber.

34. A product comprising:
a blower unit constructed and arranged to attach to an exterior surface of a structure to pressurize an interior of the structure for leak testing of the structure, wherein the blower unit comprises an impeller unit and a conduit attached to the impeller unit, wherein the blower unit is constructed and arranged to direct an air flow from outside of the structure through the conduit and into the interior of the structure to pressurize the interior of the structure, and a coupling attached to the blower unit for detecting leaks in a structure and for attachment to a surface of the structure defining an opening, and to allow air flow through the coupling when the blower unit is attached to the coupling and to prevent air flow through the coupling when the blower unit is not attached to the coupling, and wherein the coupling further includes a pressure port defined within a surface of the coupling constructed and arranged to accommodate at least one of a differential pressure gauge fitting or tube.

35. A method comprising:
providing an opening defined within a structure;
operatively attaching a coupling to an exterior surface of the structure defining the opening so that the coupling is in fluid communication with the opening, wherein the coupling is constructed and arranged to be in a closed position to prevent air flow through the opening or an open position to allow air flow through the opening;
attaching a blower unit to the coupling when the coupling is in an open position;
flowing air into an interior of the structure to pressurize the interior of the structure using the blower unit;
spraying a solution having a surface tension to produce bubbles when air is blown onto it; and
determining a location of a leak where bubbles are present, wherein the structure is a recreational vehicle comprising a roof vent, and wherein the coupling is attached to a roof of the recreational vehicle separate and apart from the roof vent.

36. A method comprising:
providing an opening defined within a structure;
operatively attaching a coupling to an exterior surface of the structure defining the opening so that the coupling is in fluid communication with the opening, wherein the coupling is constructed and arranged to be in a closed position to prevent air flow through the opening or an open position to allow air flow through the opening;
attaching a blower unit to the coupling when the coupling is in an open position;
flowing air into an interior of the structure to pressurize the interior of the structure using the blower unit;
spraying a solution having a surface tension to produce bubbles when air is blown onto it; and
determining a location of a leak where bubbles are present, wherein the structure is a recreational vehicle, and wherein the coupling is attached to a bottom surface of the recreational vehicle.

* * * * *